United States Patent
van de Nieuwelaar et al.

[11] Patent Number: 5,122,090
[45] Date of Patent: Jun. 16, 1992

[54] DECROPPING DEVICE FOR POULTRY

[75] Inventors: Adrianus J. van de Nieuwelaar, Gemert; Petrus C. M. Janssen, Wilbertoord, both of Netherlands

[73] Assignee: Stork PMT B.V., Handelstraat, Netherlands

[21] Appl. No.: 539,084

[22] Filed: Jun. 15, 1990

[30] Foreign Application Priority Data

Jun. 20, 1989 [NL] Netherlands ............... 8901551

[51] Int. Cl.⁵ ............................................. A22C 25/16
[52] U.S. Cl. .......................................... 452/116; 452/117
[58] Field of Search ........................ 452/116, 117, 106

[56] References Cited

U.S. PATENT DOCUMENTS

| | | | |
|---|---|---|---|
| 2,512,290 | 6/1950 | Spang | 452/117 |
| 2,795,817 | 6/1957 | Dahlberg | 452/116 |
| 3,137,031 | 6/1964 | Ine | 452/116 |
| 3,526,018 | 9/1970 | Louitt | 452/116 |
| 4,024,603 | 5/1977 | Harben, Jr. | 452/116 |
| 4,208,764 | 6/1980 | Loth et al. | 452/116 |
| 4,610,050 | 9/1986 | Tieleman et al. | 452/117 |
| 4,788,749 | 12/1988 | Hazenbroek | 452/116 |
| 4,910,829 | 3/1990 | Simmons | 452/116 |

FOREIGN PATENT DOCUMENTS

| | | |
|---|---|---|
| 0162154 | 11/1985 | European Pat. Off. |
| 178825 | 4/1986 | European Pat. Off. |
| 0204366 | 12/1986 | European Pat. Off. |
| 2050520 | 4/1971 | France |
| 7303652 | 9/1973 | Netherlands |
| 7306058 | 11/1974 | Netherlands |
| 2147190 | 5/1985 | United Kingdom |

Primary Examiner—Willis Little
Attorney, Agent, or Firm—Hurt, Richardson, Garner, Todd & Cadenhead

[57] ABSTRACT

A device for the removal of the gullet, crop, windpipe and adhering parts from the neck part of slaughtered poultry, comprising a rotary driven mandrel which is conveyed from the belly cavity into and through the neck opening of the poultry, wherein the mandrel, preferably a hollow cylinder, in the wall of which one or more openings are provided, forms part of a vacuum system, and is provided with gripping means for the parts to be removed, while openings are provided in the vacuum system near the gripping means. The gripping means advantageously lie entirely inside the outer wall of the cylinder. The gripping means may be composed of a lip which, viewed in the axial direction, is fitted above an opening in the cylinder wall. The mandrel may be composed of one or more strips which are fitted in the axial direction at the end of the decropper, one or more strips being provided with notches forming the gripping means.

7 Claims, 3 Drawing Sheets

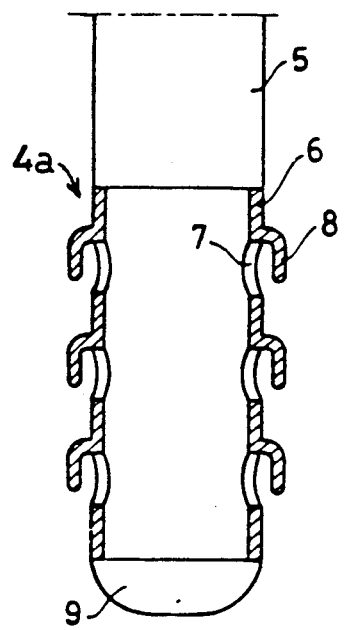
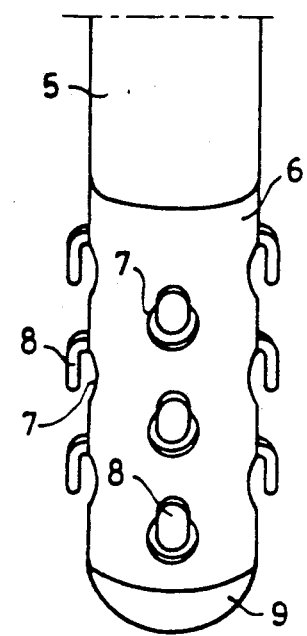
Fig. 2.
Fig. 3.
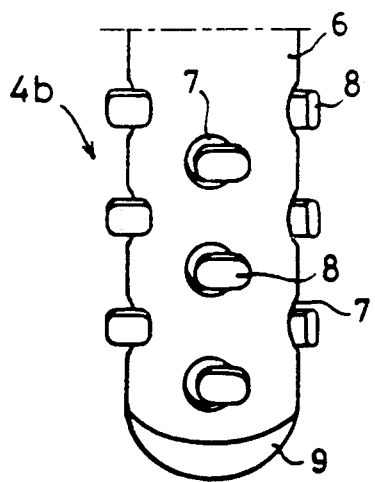
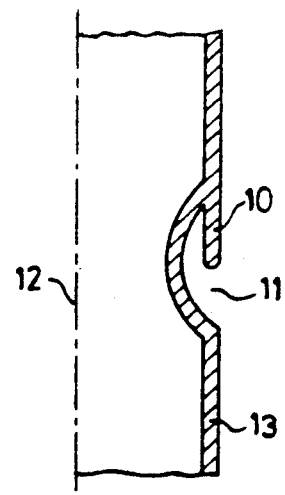
Fig. 4.
Fig. 5.

DECROPPING DEVICE FOR POULTRY

BACKGROUND OF THE INVENTION

This invention relates to a device for the removal of the gullet, crop, windpipe and adhering parts from the neck part of slaughtered poultry, comprising a rotary driven mandrel which is conveyed from the belly cavity into and through the neck opening of the poultry.

DISCUSSION OF THE PRIOR ART

Such a device is known from EP-A1-0,162,154, in which a so-called "decropper" is used in mechanized and automated slaughter systems for poultry. After evisceration, parts of gullet, windpipe, crop and any adhering parts can be left behind in the neck region, and must be removed for hygienic and marketing reasons.

This removal can be carried out with the decropper which is known per se. It is important here first of all that removal should take place with great certainty. Insufficiently decropped birds have to be returned to the decropper again after inspection. This leads to a lower capacity of the slaughter system, or to higher slaughter costs for the same capacity.

Secondly, it is important that the decropping takes place in such a way that the poultry is not damaged. This could involve damage to or breakage of bones of the poultry and damage to meat of the poultry.

Thirdly, partly in view of the trend towards a high degree of automation in slaughter systems, it is increasingly important that the operations carried out on the poultry are carried out in such a way that as much meat as possible becomes available as an end product.

In order to meet the first requirement, the above-described decropper (EP-A1-0,162,154) must have a certain minimum diameter, so that when the mandrel is inserted into the neck opening the neck is stretched somewhat. This decropper will therefore not be able to meet the second and third requirements because the forces exerted by the mandrel on the neck opening can lead to damage of bone and/or meat.

Other decroppers are also known per se, such as the decropper according to U.S. Pat. No. 4,208,764. The latter cannot meet the second and third requirements because the mandrel used is provided with angular, radially directed projections. Moreover, the neck region is pulled additionally against these angular parts, due to the vacuum used.

The decropper known from NL-A-8303633 cannot meet the second and third requirements because the mandrel used therein is provided at its end with forward-pointing projections which are of such a shape that there is a great risk of damage to bones and meat through the action of the pointed projections thereon. Similar disadvantages are demonstrable for the decropper according to EP-B1-0,178,825.

From EP-B1-0,204,366 a decropper is known which does meet the three requirements through the fact that the actual working mandrel thereof is partially enclosed by a non-rotating smooth cylinder moving with the mandrel in the axial direction. This decropper is, however, mechanically more complex than a decropper with only a mandrel.

Finally, reference should be made to a decropper from NL 8801707, which meets the second and third requirements by avoiding the use of pointed and angular parts in the mandrel. However, the first requirement is met to a lesser extent.

SUMMARY OF THE INVENTION

The object of the invention is to provide a decropper which meets all three of the above-mentioned requirements and is also very simple in design. This object is attained according to the invention, wherein the mandrel forms part of a vacuum system, and is provided with gripping means for the parts to be removed, while openings are provided in the vacuum system near the gripping means.

Through these measures, in particular the presence of the openings in the vacuum system, the size of the mandrel can be selected in such a way that forces are exerted as little as possible on the neck part of the poultry. In particular, it is possible to reduce forces stretching the neck part or forces in the case of which the internal neck opening is stretched so that the size of said opening increases. Through the action of the vacuum, the inside of the neck opening is brought into intimate contact with the mandrel. The mandrel can be in different forms. It could be two or more axially directed bars or strips, the bars or strips being provided with the gripping means and the openings in the vacuum system being provided near or in these gripping means.

Advantageously, the mandrel is in the form of a cylinder in which a gripping means in conjunction with an opening in the vacuum system is provided at one or more places. In the simplest form, the cylindrical mandrel is a hollow cylinder which is closed at the end.

The gripping means are advantageously designed with rounded-off forms. The gripping means/hole configuration can be executed in such a way that this configuration falls entirely within the external surface of the mandrel, so that the mandrel exhibits no projecting parts.

The claims and many of the attendant advantages will be more readily appreciated as the same becomes better understood by reference to the following detailed description and considered in connection with the accompanying drawings in which like reference symbols designate like parts in the figures.

DESCRIPTION OF THE DRAWINGS

FIG. 2 shows the cross-section of an embodiment of the device;

FIG. 3 is a perspective view of the embodiment according to FIG. 2;

FIG. 4 shows another embodiment;

FIG. 5 shows in cross-section an embodiment of a gripping means/hole configuration;

DESCRIPTION OF THE PREFERRED EMBODIMENTS

Figure 1:
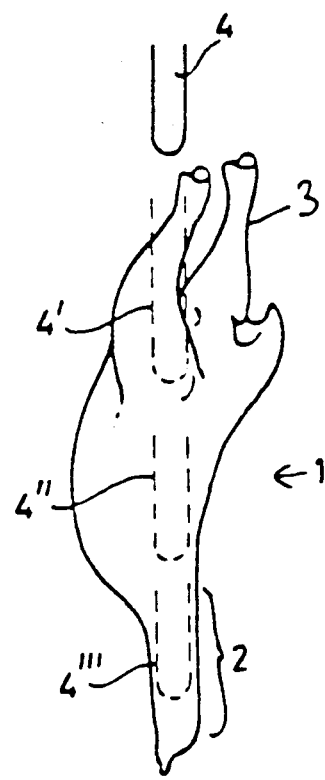
FIG. 1 shows a bird being decropped.

FIG. 1 shows a bird 1, such as a chicken, turkey etc., with neck part 2 and legs 3. The decropper 4 is shown schematically, as are the successive positions 4', 4" and 4''' thereof. In general, the bird will hang by the legs in a hook which moves along a conveyor track for conveying the birds past different processing stations.

FIG. 2 shows in cross-section an embodiment of a decropper 4a according to the invention which is a part of a vacuum system, and for this purpose is connected by the top part 5 to a channel (not shown) which is connected to a vacuum pump. The operating part of the decropper 4a consists of a mandrel in the form of a hollow cylinder 6, the wall of which is designed with, in this case circular, holes 7. Gripping means 8 are fitted on the outside of the hollow cylinder, in the vicinity of the holes, for gripping the parts to be removed from the birds. In this case they are formed by a lip 8 which partially overlaps the hole 7 and is welded on just above said hole. The hollow cylinder is shut off at the bottom side by a cover 9.

FIG. 3 shows the decropper in perspective view.

FIG. 4 shows another embodiment in perspective view; in the case of this decropper 4b each lip 8 is welded onto the side of a hole 7.

If the decropper is put into the neck part of the bird, the neck part will be pulled around the mandrel of the decropper through the action of the vacuum present in the decropper, which constitutes an ideal situation, because the gripping means will grip the gullet, windpipe etc. with certainty. These parts to be removed will be carried along with the rotary decropper through and past the neck part 2. When the decropper has come out of the neck part of the bird, the adhering parts will be removed from the the decropper and the latter will be cleaned before being pulled back through the neck part.

FIG. 5 shows a cross-section of a possible configuration of a gripping means 10 in conjunction with an opening 11 of the vacuum system. This configuration is a part of a decropper with axis of rotation 12 which is not shown in any further detail. The advantage of this configuration is that the fixing means 10 lies entirely inside the outer wall 13 of the decropper body. Therefore the decropper body has no projecting parts, so that the risk of damage to bones or meat is further reduced, particularly if the decropper body is a cylinder with axis 12.

Figure 6:
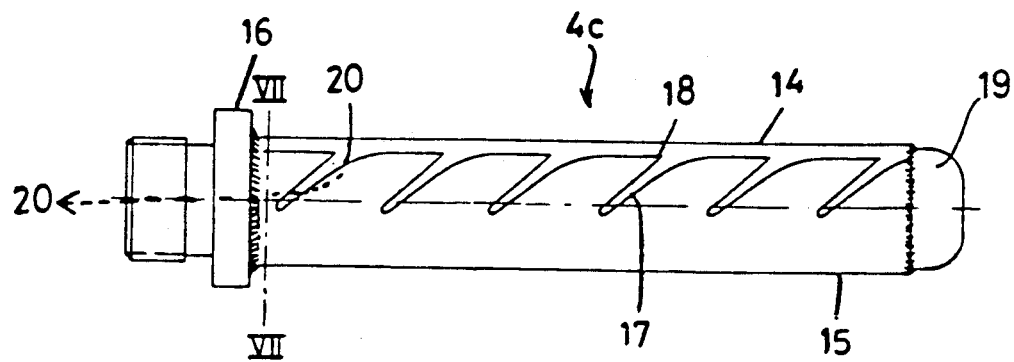
FIG. 6 shows a side view of yet another embodiment.
Figure 7:
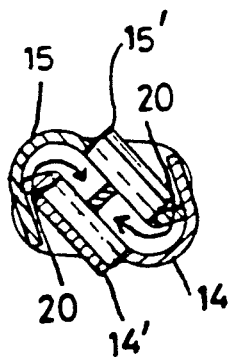
FIG. 7 shows a cross-section along the line VII—VII in FIG. 6.

FIGS. 6 and 7 show yet another embodiment of a decropper 4c. The latter is composed of two parallel, curved strips 14 and 15 which are fixed to straight strips 14' and 15', the latter in turn being fastened to the end 16 of the decropper. Parts 14, 15, 14' and 15' form the mandrel of this decropper. The strips are designed with incisions or gripping means 17, which end in a point 18. Advantageously, the ends of the curved strips are directed in such a way that they essentially point in the direction of a tangent on the circle which the end of the curved strip describes during rotation of the decropper. The decropper is also provided with a front side 19 which forms part of the wall of the vacuum system; the path of air drawn in by the vacuum system is indicated by the arrow 20.

What is claimed is:

1. A device for the removal of the gullet, crop, windpipe and adhering parts from the neck part of slaughtered poultry, comprising a rotary driven mandrel which is adapted to be conveyed from the belly cavity of the poultry into and through the neck opening of the poultry, said mandrel being hollow and adapted to be attached to a vacuum system, said mandrel having a generally outer wall having at least one opening communicating with an interior region of said hollow mandrel and wherein said mandrel includes a gripping means near said opening, wherein said gripping means comprises a lip positioned outside of said generally outer wall opposite said interior region and extending generally over said opening.

2. A device according to claim 1, wherein said mandrel comprises a hollow cylinder, and wherein a plurality of openings are provided in said generally outer wall.

3. A device as claimed in claim 1 wherein said gripping means comprises at least two lips, each of said lips extending perpendicularly to the length of said mandrel.

4. A device as claimed in claim 1 wherein said gripping means comprises at least two lips, each of said lips extending parallel to the length of said mandrel.

5. A mandrel for removing the crop and related parts from the neck portion of slaughtered poultry, said mandrel comprising an elongate, generally cylindrical, hollow member having a radial direction and a direction of elongation and adapted to be driven in rotation and adapted to be conveyed from the belly cavity of the poultry into and through the neck opening of the poultry, said cylindrical member being adapted to be attached to a source of vacuum, said cylindrical member having a plurality of openings formed in an outer wall thereof, and said mandrel further comprising gripping members associated with said openings and positioned radially beyond said outer wall and extending generally transverse to the radial direction.

6. A mandrel as claimed in claim 5 wherein said gripping members are elongate and oriented to be transverse to the direction of elongation of said mandrel.

7. A mandrel as claimed in claim 5 wherein said gripping members are elongate and oriented to be generally parallel to the direction of elongation of said mandrel.

* * * * *